United States Patent
Auer

(10) Patent No.: US 10,918,081 B2
(45) Date of Patent: Feb. 16, 2021

(54) ANIMAL EAR TAG HAVING A SPIKE

(71) Applicant: SMARTBOW GMBH, Weibern (AT)

(72) Inventor: Wolfgang Auer, Weibern (AT)

(73) Assignee: SMARTBOW GMBH, Weibern (AT)

( * ) Notice: Subject to any disclaimer, the term of this patent is extended or adjusted under 35 U.S.C. 154(b) by 0 days.

(21) Appl. No.: 16/533,040

(22) Filed: Aug. 6, 2019

(65) Prior Publication Data

US 2019/0357496 A1 Nov. 28, 2019

Related U.S. Application Data

(63) Continuation of application No. PCT/AT2018/000005, filed on Feb. 6, 2018.

(51) Int. Cl.
*A01K 11/00* (2006.01)

(52) U.S. Cl.
CPC .................. *A01K 11/001* (2013.01)

(58) Field of Classification Search
CPC .................................... A01K 11/001
USPC .......................................... 40/301
See application file for complete search history.

(56) References Cited

U.S. PATENT DOCUMENTS

| | | | | |
|---|---|---|---|---|
| 4,958,452 A * | 9/1990 | Tate | ...................... | A01K 11/001 119/655 |
| 2007/0199215 A1* | 8/2007 | Gardner | ............... | A01K 11/004 40/301 |
| 2011/0232142 A1* | 9/2011 | Jones | .................... | A01K 11/001 40/301 |
| 2018/0027765 A1* | 2/2018 | Butler | .................. | A01K 11/001 |

FOREIGN PATENT DOCUMENTS

| | | |
|---|---|---|
| DE | 69504644 T2 | 4/1999 |
| EP | 0047697 A1 | 3/1982 |
| GB | 1485847 A | 9/1977 |
| GB | 2066164 | 7/1981 |
| WO | WO 91/10982 A1 | 7/1991 |
| WO | WO 95/25426 A1 | 9/1995 |

OTHER PUBLICATIONS

PCT International Preliminary Report and Written Opinion, Non-English, International Application No. PCT/AT2018/000005, International Filing Date Feb. 6, 2018, dated Aug. 22, 2019.
PCT International Preliminary Report and Written Opinion, English Translation, International Application No. PCT/AT2018/000005, International Filing Date Feb. 6, 2018, dated Aug. 22, 2019.

* cited by examiner

*Primary Examiner* — Kristina N Junge
(74) *Attorney, Agent, or Firm* — Scott C. Mayhew

(57) ABSTRACT

The invention relates to an animal ear tag that comprises a spike (1) and two outer parts (2, 3), which come to rest on opposite sides of the animal's ear, wherein the spike (1) has a plurality of parts (5, 6, 7), made of a relatively hard material and arranged one behind the other in the longitudinal direction of the spike (1), and another part made of an elastically softer material and extending, in the longitudinal direction of the spike (1), along a plurality of the parts (5, 6, 7) made of a relatively hard material, connecting the same. The parts (5, 6, 7) that are made of a relatively hard material are stacked on one another. The part that is made of an elastically softer material is a sheath (8), which encases a plurality of the stacked parts (5, 6, 7) made of a relatively hard material, on the lateral surface of the stack that is formed by said parts.

5 Claims, 1 Drawing Sheet

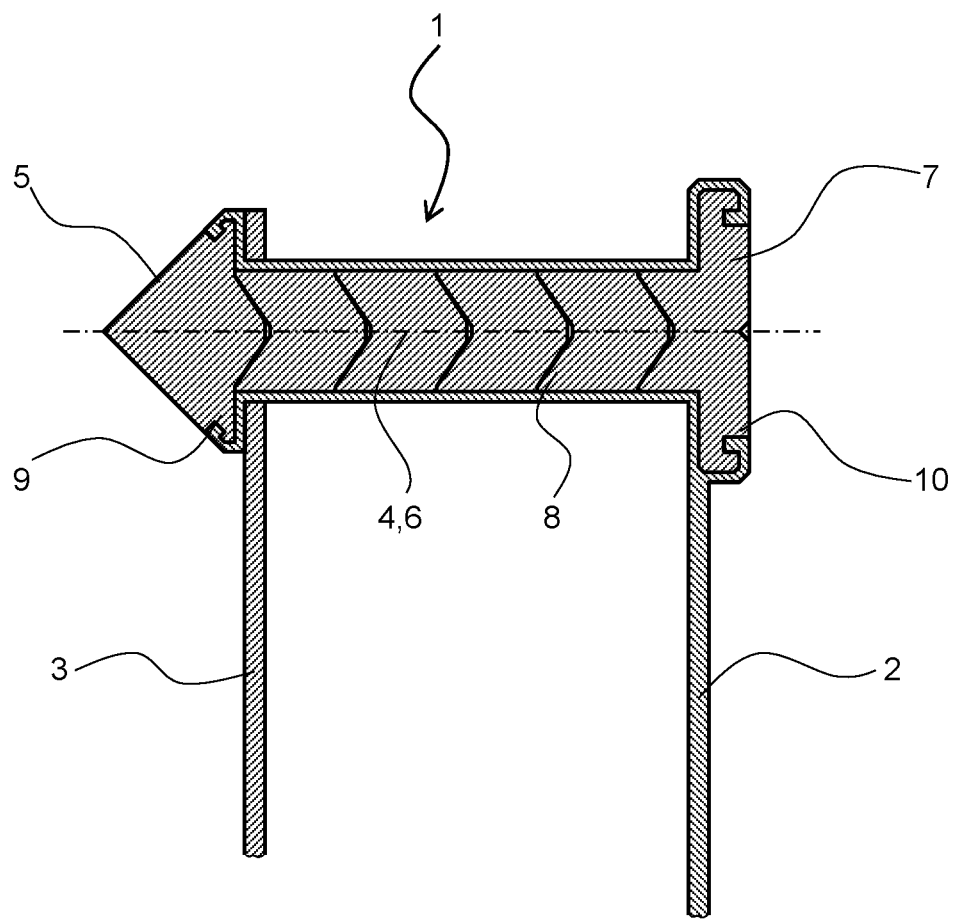

ANIMAL EAR TAG HAVING A SPIKE

CROSS REFERENCE TO RELATED APPLICATIONS

This application is a continuation of International Application No. PCT/AT2018/000005, filed Feb. 6, 2018, which claims the benefit of Austrian Patent Application No. A42/2017, filed Feb. 8, 2017, both of which are expressly incorporated herein by reference in their entirety.

The invention relates to an animal ear tag that has a spike.

An animal ear tag is intended to be worn on the ear of an animal, typically a cow or a pig, and provides information about the animal in question. This information may be provided in the form of written characters that can be read by humans and/or in the form of electronic data stored in the animal ear tag.

Animal ear tags of the type discussed here comprise two "outer parts" lying on opposite sides of the animal ear, along with a spike. When the animal ear tag is properly attached to the animal's ear, the two outer parts rest on opposite sides of the pinna of the animal's ear and are connected by the spike, with the spike passing through a through hole in the pinna. The spike is a slender, elongated part. It is typically connected, e.g. monolithically, to one of the two outer parts before attachment to the animal's ear, and is locked onto the second outer part during attachment to the animal's ear.

An outer portion of the animal ear tag may be either a relatively large badge, or a housing that includes electronic components, or a combination of the two.

To attach an animal ear tag to the ear of an animal, the spike—and the outer portion already attached thereto—is placed in a receptacle on a jaw of a pair of pliers such that the spike is pointing with its unattached end, configured as a sharp point, facing the second jaw of the pliers. The second outer part of the animal ear tag is placed in a receptacle on the second jaw of the pliers. The jaws are then moved toward each other with the pinna of the animal interposed therebetween. The spike thereby penetrates with its unattached end configured as a sharp point through the pinna of the animal—thus itself creating the necessary through hole in the pinna—and is finally locked on to the second outer part located on the second jaw of the pliers.

For the process of attachment to the animal's ear, the spike should be as stiff as possible; otherwise there is a risk that it may buckle during the piercing process. In contrast, once attachment is complete, the spike should be more flexible, as it is more comfortable and healthier for the animal, and the animal ear tag will yield more flexibly when the animal brushes up with the animal ear tag against an object.

The documents GB 1485447 A and GB 2066164 A describe animal ear tags in which the majority of the longitudinal portion of the spike is configured as a tube that is open at one end face, with the opening being at the unattached end of the spike. For the process of attaching the animal ear tag to the animal's ear, an arrow-shaped, stiff metal pin is inserted into the elongated cavity in the spike, thereby reinforcing the spike and providing a sharp point for penetration through the pinna. Once the animal ear tag has been attached to the animal's ear, the metal pin is removed from the spike, so that the spike becomes relatively elastic and yielding. This enables the spike to adapt to the animal's ear enough that chafing and further injury to the hole through the animal's ear rarely occur.

Currently, animal ear tags that have a tubular hollow spike are most commonly used, with the cavity being open toward the rear—i.e., the attached end—of the spike. During attachment, a stiffening pin rigidly connected to a pair of attachment pliers protrudes into the cavity in the spike, thereby stiffening the spike. With the release of the pliers following attachment of the animal ear tag, the stiffening pin is pulled back out of the cavity and the spike becomes more flexible again.

In contrast to the design according to GB 1485447 A and GB 2066164 A, it is advantageous that the stiffening pin is not a loose part, but part of the pliers, and does not come into contact with living tissue, and thus can be used many times without problems. It is disadvantageous that the opening of the cavity in the spike must pass through that part of the ear tag with which the spike is monolithically connected. Particularly in so-called active animal ear tags, i.e., those in which the main part comprises a housing in which electronic components along with a battery or an accumulator are contained, this leads to problems with space, because in these animal ear tags, for reasons of mass dynamics, the space located in the main part along the spike axis should be occupied by other parts.

FIG. 3 of DE 69504644 T2 shows a spike for an animal ear tag, which is constructed of multiple parts. These parts comprise a plurality of circular cylindrical, hollow parts that are arranged coaxially to one another and one behind the other in the axial direction, and abut against one another on flat end faces. A flexible connecting element made of a soft elastic material extends through the central axial cavity of all of these parts. The spike is thus advantageously stiff and rigid relative to pressure in the axial direction, and at the same time is advantageously yielding relative to bending and shear stress perpendicular to the axial direction.

The disadvantage is that open gaps remain between the individual circular cylindrical parts for piercing the animal ear. These pose a significant health risk to the animal, as they can create and maintain a breeding ground for pathogens.

The problem addressed by the invention is to improve the design of an animal ear tag, the spike of which is rigid and fixed against axial compressive force, at least during the process of attachment to the animal's ear, but is pliant under bending stress around bending axes that extend perpendicular to its axis, as compared with known designs. The improvement should be that a stiffening part does not need to be subsequently removed from the spike, and that the outer surface of the spike has no abutting surface between two parts, and thus has no gap.

To solve the stated problem, the features from DE 69504644 T2 that the spike has a plurality of parts made of a relatively hard material and arranged in a row longitudinally along the spike, along with another part made of an elastically softer material, extending, in the longitudinal direction of the spike, along a plurality of the parts that are made of a relatively hard material, connecting the same, are adopted.

As an improvement according to the invention, it is proposed that the parts made of a relatively hard material are stacked on one another, and that the part that is made of the elastically softer material is a sheath, which encases a plurality of the stacked parts made of a relatively hard material, on the lateral surface of the stack that is formed by said parts.

In a particularly preferred further development, the sheath does not adhere to the material of the stacked parts.

The sheath is preferably made of a material that can be molded in a plastic injection molding process and is formed by overmolding the stacked parts.

The invention will be described in greater detail with reference to a drawing:

FIG. 1 shows a somewhat stylized lateral sectional view an exemplary animal ear tag according to the invention.

The animal ear tag according to FIG. 1 has a spike 1 and the two outer parts 2, 3, which in this example are merely simple flat badges.

The spike 1, which is typically circular symmetrical, has a core 4 composed of parts 5, 6, 7 that are made of a relatively hard material, and a sheath 8 made of a material that is significantly more elastic than the material of the parts 5, 6, 7.

The parts 5, 6, 7 made of a relatively hard material are stacked on one another in the longitudinal direction of the core 4.

"Stacked on one another" means that every two adjacent parts are moved toward one another along a stacking direction until they are in mutual contact, and at the contact surface, at least one elevation on one part 5, 6, 7 protrudes into a depression on the second part 5, 6, 7, the two parts rest against one another along surface parts of said elevation and said depression, and relative displacement of the two parts perpendicular to the stacking direction must necessarily accompany a movement of the two parts away from one another in the stacking direction. "Stacked on one another" therefore means that the parts 5, 6, 7 are pushed together as far as possible in the stacking direction, and thus rest against one another in a precisely defined manner in their relative position perpendicular to the stacking direction.

Ideally, the angle between the contact surfaces of adjacent parts 5, 6, 7 made of a relatively hard material and the stacking direction is significantly greater than the angle of friction between the materials of the contacting surfaces. Thus, no frictional plug-in connection or wedge connection is formed between the adjacent parts. Such a connection would restrict the desired flexibility of the spike 1 too much.

The parts 5, 6, 7 made of a relatively hard material together form a kind of arrow, with the part 5 that forms the tip of the arrow being wider than the adjoining middle parts 6, which are followed by the part 7, which widens again and forms the arrow end.

According to an advantageous method for producing the spike 1, the parts 5, 6, 7 made of a relatively hard material are inserted as a stack into a plastic injection molding tool, in which the stack is secured at the foremost and at the rearmost parts 5, 7 and is overmolded with the material of the sheath 8. The material of the sheath is typically a rubber-elastic and injection-moldable plastic.

Ideally, an antibacterial and antiseptic agent is incorporated into the material of the sheath 8 and/or the sheath 8 is coated with such an agent.

Ideally, the sheath 8 and the middle part 6 do not adhere to each other, as this would severely limit the bending flexibility of the spike 1. If necessary, adhesion between the sheath 8 and the parts 6 can be avoided by coating the lateral surface of the middle parts 6 with a release agent prior to overmolding with the material of the sheath 8.

Ideally, at the foremost part 5 made of a relatively hard material and at the rearmost part 7 made of a relatively hard material, the sheath 8 extends onto surface areas of these parts that face away from the middle parts 6 made of a relatively hard material. Thus, the sheath 8 form-fittingly prevents the parts 5, 6, 7 made of a relatively hard material from moving away from one another in the longitudinal direction of the spike 1. Upon cooling of the sheath 8 after injection molding, by reverse thermal expansion of the sheath 8, an elastic pre-tensioning develops in the sheath 8, causing the sheath 8 to rest permanently flush against the parts 5, 6, 7 made of a relatively hard material, pressing adjacent parts 5, 6, 7 made of a relatively hard material together.

Ideally, at the foremost part 5 made of a relatively hard material and at the rearmost part 7 made of a relatively hard material, the sheath 8 does not extend over the entire surface that faces away from the middle parts 6 made of a relatively hard material. Thus, the surface areas of these parts 5, 7, made of a relatively hard material, that are not to be covered by the sheath and that, in any case, are not in contact with the animal's ear when the animal ear tag is attached, are available during production of the sheath 8 for use by a tool for holding the stack of parts 5, 6, 7 made of a relatively hard material.

The layer thickness of the sheath 8 is typically between 0.5 and 1 mm.

The sheath 8 can also be applied, for example, by coating the parts 5, 6, 7 made of a relatively hard material. In that case, the coating and surface pretreatment of the middle parts 6 made of a relatively hard material must be adapted such that a small degree of adhesion occurs between the coating and the parts 6. Once the coating has cured, this adhesion, which at that point is actually undesirable, can be overcome by gently bending the spike 1.

In the example shown, the badge-shaped outer part 2 is configured as monolithically connected to the spike 1, or more specifically to the sheath 8. To this end, the outer part 2 may be formed along with the sheath 8 in a common injection molding process. If the outer part 2 and the sheath 8 are to be made of different materials, however, two-component injection molding may be used. According to an advantageous embodiment that is not depicted, the parts 5, 6, 7 made of a relatively hard material have one or more openings or grooves, which extend continuously in the longitudinal direction or in the transverse direction of the spike 1 and which are aligned from harder part 5, 6, 7 to harder part 5, 6, 7, these openings being filled, typically by injection molding, with the flexible material from which the sheath 8 is also made. As compared with the design depicted in FIG. 1, this makes it easier to achieve high durability of the spike.

The invention claimed is:

1. An animal ear tag, comprising a spike and two outer parts that come to rest on opposite sides of the animal's ear, wherein the spike has a plurality of spike parts, which are a front part, middle parts and a rear part, and which are made of a relatively hard material and arranged one behind the other in the longitudinal direction of the spike, and a sheath made of an elastically softer material and extending, in the longitudinal direction of the spike, along the spike parts, connecting the same, wherein the spike parts are stacked on one another, and in that the sheath encases a plurality of the stacked spike parts, on the lateral surface of a stack that is formed by said spike parts, wherein the sheath does not adhere to the middle parts of the spike.

2. The animal ear tag according to claim 1, wherein, at the front part and at the rear part, the sheath extends onto surface areas that lie facing away from the middle parts.

3. The animal ear tag according to claim 1, wherein, at the front part and at the rear part, surface areas that lie facing away from the middle parts are not covered by the sheath.

4. The animal ear tag according to claim 1, wherein the sheath is formed in a plastic injection molding process by overmolding of the spike parts.

5. The animal ear tag according to claim 1, wherein the spike parts have one or more openings or grooves, which extend continuously in one of the longitudinal and transverse direction of the spike and which are filled with the material from which the sheath is also made.

* * * * *